(12) United States Patent  
Jeong

(10) Patent No.: US 8,151,136 B2  
(45) Date of Patent: Apr. 3, 2012

(54) METHOD AND DEVICE FOR CORRECTING CODE DATA ERROR

(75) Inventor: Jong-Sik Jeong, Seoul (KR)

(73) Assignee: MTekvision Co., Ltd., Seoul (KR)

( * ) Notice: Subject to any disclaimer, the term of this patent is extended or adjusted under 35 U.S.C. 154(b) by 971 days.

(21) Appl. No.: 12/096,482

(22) PCT Filed: Sep. 11, 2006

(86) PCT No.: PCT/KR2006/003611  
§ 371 (c)(1),  
(2), (4) Date: Jun. 6, 2008

(87) PCT Pub. No.: WO2007/066482  
PCT Pub. Date: Jun. 14, 2007

(65) Prior Publication Data  
US 2008/0263429 A1    Oct. 23, 2008

(30) Foreign Application Priority Data  
Dec. 9, 2005    (KR) .................... 10-2005-0120965

(51) Int. Cl.  
*G06F 11/00* (2006.01)

(52) U.S. Cl. ........................................ 714/6.12; 714/6.3

(58) Field of Classification Search .................. None  
See application file for complete search history.

(56) References Cited

U.S. PATENT DOCUMENTS

| 4,794,597 | A | 12/1988 | Ooba et al. |
| 5,894,563 | A * | 4/1999 | Saperstein ................. 710/305 |
| 6,584,560 | B1 * | 6/2003 | Kroun et al. .................. 713/2 |
| 7,594,135 | B2 * | 9/2009 | Gonzalez et al. ............ 714/6.1 |
| 2006/0179302 | A1 * | 8/2006 | Hatakeyama ................ 713/164 |

FOREIGN PATENT DOCUMENTS

JP    59-148954 A    8/1984

* cited by examiner

*Primary Examiner* — Michael Maskulinski  
(74) *Attorney, Agent, or Firm* — Birch, Stewart, Kolasch & Birch, LLP

(57) ABSTRACT

A method and a device for correcting a code data error are disclosed. A main processor included in a digital processing device in accordance with an embodiment of the present invention writes in a shared memory third code data error-corrected by a predetermined error correcting method or second code data written in a backup area if there is an error in first code data written in a code data area of a nonvolatile memory. The main processor or an application processor performs an operation corresponding to the third code data. With the present invention, a system can be stably operated thanks to promptly dealing with an error when the error in boot codes is detected or generated.

21 Claims, 6 Drawing Sheets

PRIOR ART

METHOD AND DEVICE FOR CORRECTING CODE DATA ERROR

CROSS-REFERENCE TO RELATED APPLICATIONS

This application claims foreign priority benefits under 35 U.S.C. .sctn. 119(a)-(d) to PCT/KR2006/003611, filed Sep. 11, 2006, which is hereby incorporated by reference in its entirety.

BACKGROUND

1. Technical Field

The present invention relates to a digital processing device, more specifically to a method and a device for correcting a code data error.

2. Description of the Related Art

As an example of digital processing devices, portable terminals refer to electronic devices that can be easily carried by making the size compact in order to perform functions such as game and mobile communication. Portable terminals include mobile communication terminals, personal digital assistants (PDA), portable multimedia players (PMP) and car navigation devices.

Among the portable terminals, the mobile communication terminal is essentially a device designed to enable a mobile user to telecommunicate with a receiver who is remotely located. Thanks to scientific development, however, the latest mobile communication terminals have functions, such as camera and multimedia data playback, in addition to the basic functions, such as voice communication, short message service and address book.

FIG. 1 illustrates s a block diagram of a conventional mobile communication terminal having a camera function.

Referring to FIG. 1, the mobile communication terminal 100 having a camera function comprises a high frequency processing unit 110, an analog-to-digital converter 115, a digital-to-analog converter 120, a processing unit 125, a power supply 130, a key input 135, a main memory 140, a display 145, a camera 150, an image processing unit 155 and a support memory 160.

The high frequency processing unit 110 processes a high frequency signal, which is transmitted or received through an antenna.

The analog-to-digital converter 115 converts an analog signal, outputted from the high frequency processing unit 110, to a digital signal and sends to the processing unit 125.

The digital-to-analog converter 120 converts a digital signal, outputted from the processing unit 125, to an analog signal and sends to the high frequency processing unit 110.

The processing unit 125 controls the general operation of the mobile communication terminal 100. The processing unit 125 can comprise a central processing unit (CPU) or a microcontroller.

The power supply 130 supplies electric power required for operating the mobile communication terminal 100. The power supply 130 can be coupled to, for example, an external power source or a battery.

The key input 135 generates key data for, for example, setting various functions or dialing of the mobile communication terminal 100 and sends to the processing unit 125.

The main memory 140 stores an operating system and a variety of data of the mobile communication terminal 100. The main memory 140 can be, for example, a flash memory or an EEPROM (Electrically Erasable Programmable Read Only Memory).

The display 145 displays the operation status of the mobile communication terminal 100, relevant information (e.g. date and time) and an external image photographed by the camera 150.

The camera 150 photographs an external image (a photographic subject), and the image processing unit 155 processes the external image photographed by the camera 150. The image processing unit 155 can perform functions such as color interpolation, gamma correction, image quality correction and MEG encoding. The support memory 160 stores the external image processed by the image processing unit 155. The support memory 160 can be an SRAM (Static RAM) or an SDRAM (Synchronous DRAM).

As described above, the mobile communication terminal 100 having a camera function is equipped with a plurality of processing units (that is, a main processor and one or more application processors for performing additional functions). In other words, as shown in FIG. 1, the processing unit 125 for controlling general functions of the mobile communication terminal 100 and the image processing unit 155 for controlling the camera function are included. Each processing unit is structured to be coupled with an independent memory. For example, the main processor can be a baseband chip.

The application processor can take different forms and quantity depending on the kinds of additional functions, with which the portable terminal is equipped. For example, the application processor for controlling the camera function can process functions such as JPEG encoding and JPEG decoding; the application processor for controlling the movie file playback function can process functions such as video file (e.g., MPEG4, DIVX, H.264) encoding and decoding; and the application processor for controlling the music file playback function can process functions such as audio file encoding and decoding. The portable terminal can also comprise an application processor for controlling games. Each of these processing units has an individual memory for storing the processed data.

FIG. 2 is a coupling structure between a processor and a memory in accordance with the prior art.

As illustrated in FIG. 2, a main processor 210 basically has two buses. Typically, the bus refers to a common-purpose electric path used for transmitting information between the processor, main memory and input/output device in a digital processing apparatus. The bus includes a line for information, which represents an address of each device or a location of each memory, and another line for distinguishing various data transmission operation.

The bus has two types, one of which is an MP (main processor)-AP (application processor) bus, forming a host interface to couple to an application processor, and an MP-MM (main memory) bus, coupling to a nonvolatile memory 220 and a first volatile memory 225. The MP-MM bus can be classified into a first bus, which couples to the nonvolatile memory 220, and a second bus, which couples to the volatile memory 225. The nonvolatile memory 220 and the volatile memory 225 can be embodied as one chip by the multi-chip package technology.

The application processor 215 is coupled to the main processor 210 through the MP-AP bus, and a second volatile memory 240 through an AP-AM (application memory) bus. Further, the application processor 215 is coupled to the display 145 and the image sensor 245 through additional buses.

As illustrated in FIG. 2, in accordance with a conventional coupling structure, the main processor 210 and the application processor 215, respectively, are equipped with an exclusive memory. Accordingly, in case that the main processor 210 displays data (e.g. an MPEG file) stored in the first volatile memory through the display 145, the main processor 210 must read respective data and transfer the read data to the application processor 215 through the MP-AP bus. The application processor 215 processes (e.g. decodes) the data transferred from the main processor 210 and displays the processed data through the display 145. In this case, if large data are processed or displayed, the application processor 215 can store the respective data in the second volatile memory 245 and read the stored data at a desired time to process or transfer to the display 145.

As described above, in the conventional coupling structure, the larger the data to be transferred between the main processor 210 and the application processor 215 is, the less efficient the process of the main processor 210 and the application processor 215 becomes. This is because the main processor 210 must read and transfer the large data, and the application processor 215 must write the transferred data in the second volatile memory 245. Also, when processing the respective data, an inside element of the application processor 215 uses the AP-AM bus to access the second volatile memory 245.

The system booting highlights this problem. The general system booting processes are performed in a sequence of the main processor booting and the application booting. This will be described below in detail.

First, once the main power is applied to the main processor 210, the main processor 210 reads through the MP-MM bus boot codes written in a nonvolatile memory 315 and writes the boot codes in a program memory 235. The main processor 210 performs booting by use of the boot codes written in the nonvolatile memory 315. The program memory 235 can be an SDRAM.

Then, the main processor 210 reads through the MP-MM bus the boot codes written in the nonvolatile memory 315 (i.e. boot codes for booting the application processor 215) and transfer the boot codes to the application processor 215 through MP-AP bus. The application processor 215 writes the transferred boot codes in the nonvolatile memory 315 through the AP-AM and then performs booting.

As described above, the application processor 215 must receive the boot codes from the main processor 210 for booting. An error can occur during this operation of receiving the boot codes. Accordingly, although the boot codes must be first checked for any error, the conventional system has not been structured to check for an error. Therefore, if the boot codes contain an error, it would be impossible for the application processor 215 to operate correctly, and thus, the functions (e.g. multimedia and display control) of the application processor 215 cannot be properly operated.

SUMMARY

In order to solve the problems described above, the present invention provides a method and a device for correcting a code data error that can allow a system to be correctly operated by promptly dealing with an error when the error in boot codes is detected or generated.

The present invention also provides a method and a device for correcting a code data error that can quickly transfer boot codes and processed data to an application processor.

The present invention also provides a method and a device for correcting a code data error that can acquire the reliability of boot codes by managing backup data for the boot codes.

The present invention also provides a method and a device for correcting a code data error that can recover and use a generated bit error in 2 or more bits or boot codes deleted in a storage area written with boot codes.

The present invention also provides a method and a device for correcting a code data error that can promptly transfer and use data by dividing and applying a storage area.

In addition, the present invention provides a method and a device for correcting a code data error that can be universally applied to data required for an operation of each processor to stably operate each processor.

Other objects of the present invention will become apparent through the preferred embodiments described below.

To achieve the above objects, an aspect of the present invention features a digital processing device, a main processor and/or application processor for correcting a code data error.

According to an embodiment of the present invention, a digital processing device having a main processor and one or more application processors includes a nonvolatile memory, the nonvolatile memory being coupled to the main processor through an MP-NM bus, the nonvolatile memory comprising a code data area and a backup area, first code data being written in the code data area, second code data being backed up in the backup area, the second code data being identical to the first code data; and a shared memory, the shared memory being shared by the main processor and the application processor, the first code data or error-corrected third code data being written in the shared memory, whereas if the first code data has an error, the main processor writes in the shared memory the third data error-corrected by a predetermined error correcting method or the second code data, and the main processor or the application processor performs an operation corresponding to the third code data.

The main processor can generate the third code data by using the error correcting method if the first code data has a 1-bit error, and the main processor can generate the third code data by using the second code data if the first code data has an error of 2 or more bits.

The main processor can generate the third code data by using the error correcting method if the second code data includes a 1-bit error, and the main processor can control to output an error message if the second code data has an error of 2 or more bits.

The main processor can write the third code data in the nonvolatile memory.

The shared memory can have two or more ports, and one of the ports is assigned to the main processor and another one of the ports is assigned to the application processor.

A storage area of the shared memory can be partitioned to comprise an area accessible by the main processor only, an area accessible by the application processor only, and a common area accessible by both the main processor and the application processor.

The nonvolatile memory and the shared memory can be realized in one chip by a multi-chip package technology.

The code data can be at least one of boot code data, program executing data and code data for performing a multimedia function. The application processor can be booted by using the boot code data written in the shared memory.

According to another embodiment of the present invention, a main processor, being coupled to at least one application processor and controlling an operation of the application processor includes an interface unit, accessing a nonvolatile memory through an MP-NM bus and accessing a shared memory through an MP-VM bus; and a controller, writing in the shared memory through the interface unit third code data generated by using a predetermined error correcting method or a second code data written in a backup area of the nonvolatile memory if there is an error in first code data written in a code data area of the nonvolatile memory.

The controller can generate the third code data by using the error correcting method if the first code data has a 1-bit error, and the controller can generate the third code data by using the second code data if the first code data has an error of 2 or more bits.

The controller can generate the third code data by using the error correcting method if the second code data includes a 1-bit error, and the controller can control to output an error message if the second code data has an error of 2 or more bits.

The code data can be at least one of boot code data, program executing data and code data for performing a multimedia function. The controller can generate and write in the shared memory boot code data for booting the application processor, and the application processor can booted by using the boot code data written in the shared memory.

According to another embodiment of the present invention, an application processor, being coupled to a main processor and being controlled by the main processor includes an interface unit, accessing a shared memory through an AP-VM bus; and a controller, writing in the shared memory third code data generated by using a predetermined error correcting method or second code data written in a second area of the shared memory if there is an error in first code data written in a first area of the shared memory, and performing an operation in accordance with the third code data, whereas the main processor, having accessed the nonvolatile memory through an MP-NM bus and having accessed the shared memory through an MP-VM bus, writes in the first area first code data written in a code data area of the nonvolatile memory and writes in the second area second code data written in a backup area of the nonvolatile memory.

The controller can generate the third code data by using the error correcting method if the first code data has a 1-bit error, and the controller can generate the third code data by using the second code data if the first code data has an error of 2 or more bits.

The controller can generate the third code data by using the error correcting method if the second code data includes a 1-bit error, and the controller can control to output an error message if the second code data has an error of 2 or more bits.

To achieve the above objects, another aspect of the present invention features a data error correcting method and/or a recorded medium recording a program for executing the method thereof.

According to an embodiment of the present invention, a code data error correcting method by a main processor included in a digital processing device, the device including a main processor and at least one application processor includes (a) reading first code data written in a code data area of a nonvolatile memory and determining whether there is an error in the read code data; (b) generating and storing in a shared memory code data error-corrected by a predetermined error correcting method if there is a 1-bit error; and (c) generating and storing in the shared memory code data error-corrected by using second code data written in a backup area of the nonvolatile memory if there is an error of two or more bits, whereas the nonvolatile memory is coupled to the main processor through an MP-NM bus, and the shared memory is shared by the main processor and the application processor.

DETAILED DESCRIPTION

Figure 1:
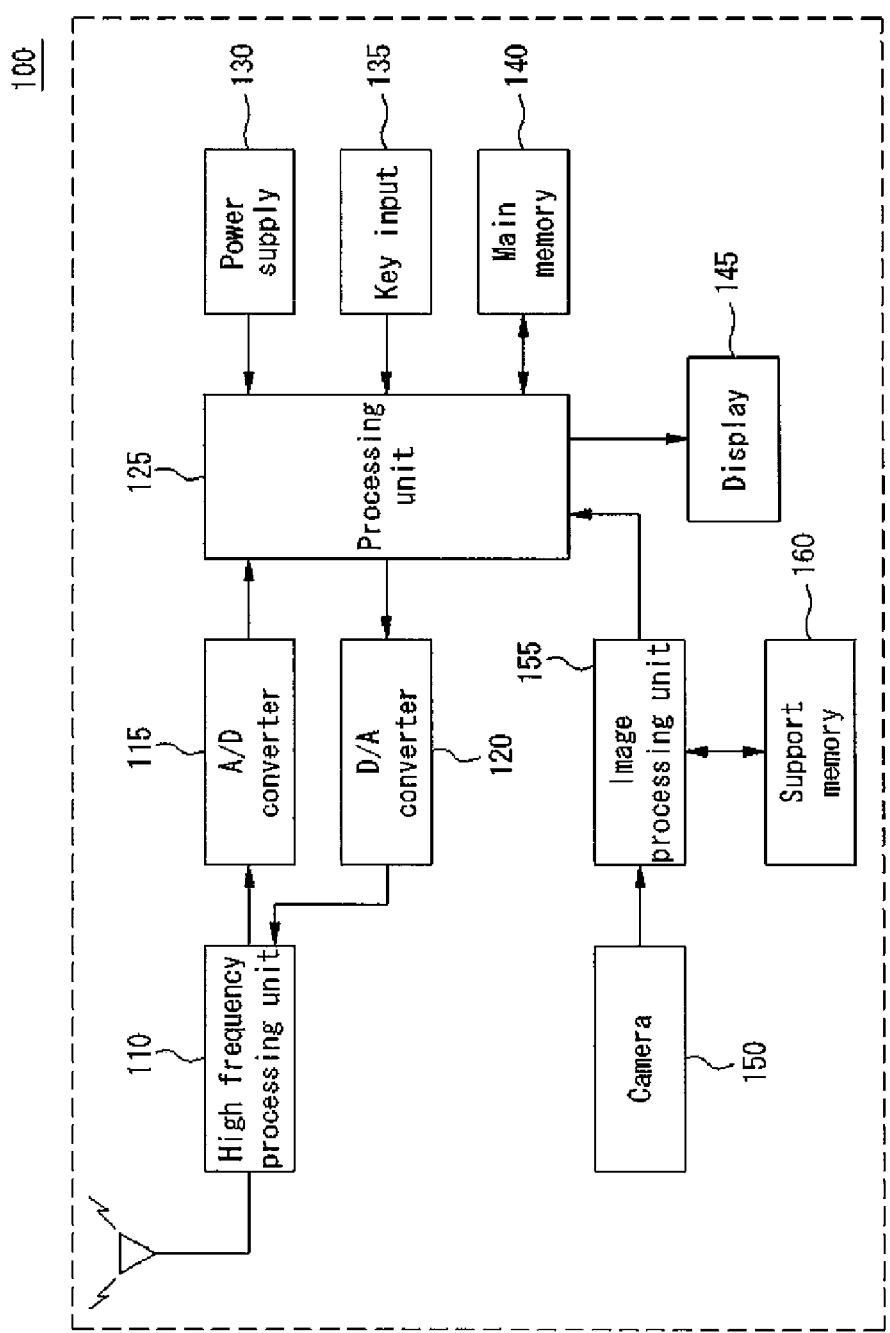
FIG. 1 illustrates a block diagram of a conventional mobile communication terminal having a camera function.
Figure 2:
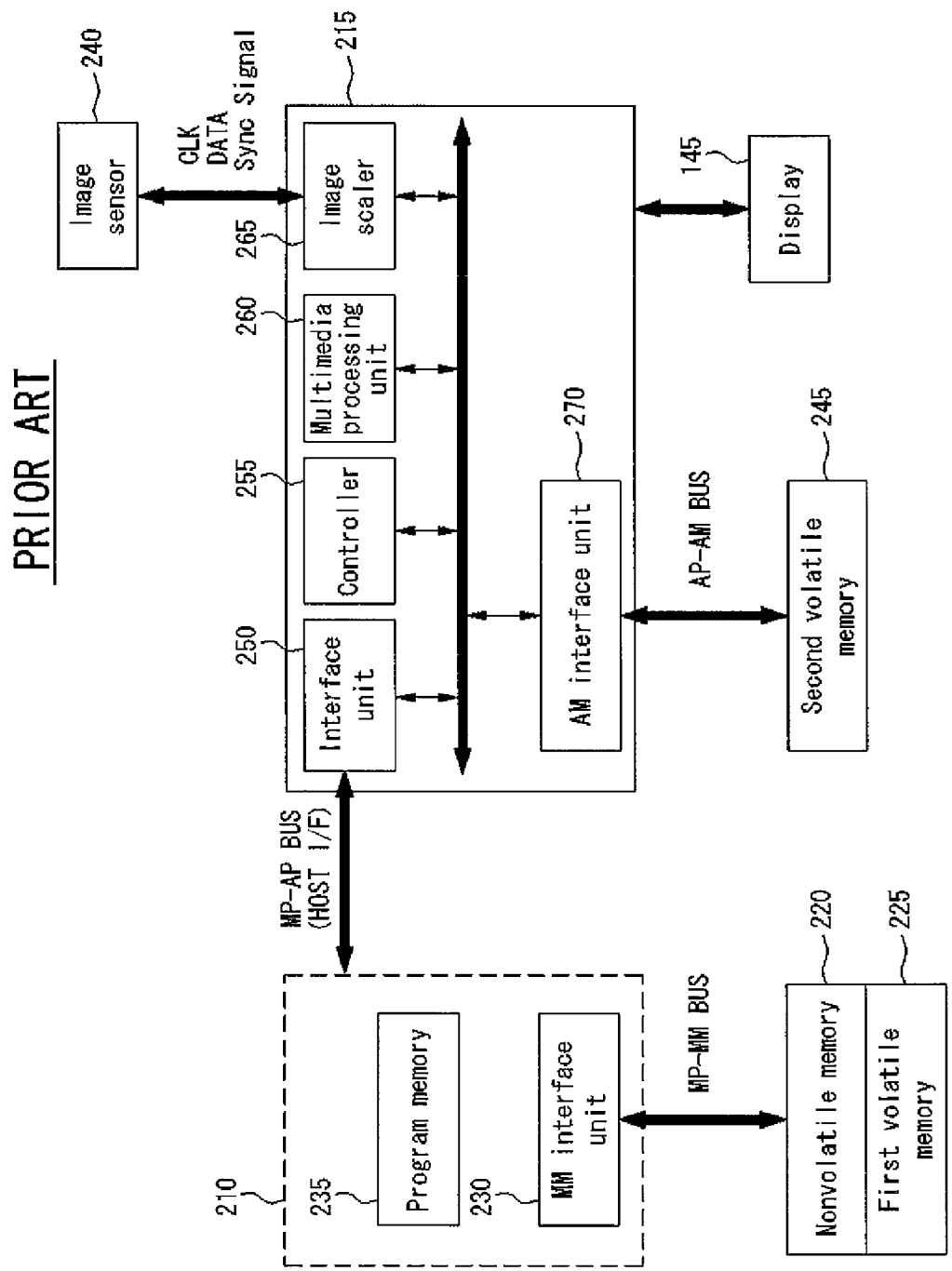
FIG. 2 illustrates a coupling structure between a processor and a memory in accordance with the prior art.

The above objects, features and advantages will become more apparent through the below description with reference to the accompanying drawings.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, preferred embodiments will be described in detail with reference to the accompanying drawings. Identical or corresponding elements will be given the same reference numerals, regardless of the figure number, and any redundant description of the identical or corresponding elements will not be repeated.

Although it is evident that the method of controlling a display using a shared memory in accordance with the present invention can be equivalently applied to all types of digital processing devices or systems (e.g. portable terminals and/or home digital appliances, such as the mobile communication terminal, PDA, portable multimedia player (PMP), MP3 player, digital camera, digital television, audio equipment, etc.), which has a plurality of processors and in which a particular memory needs to be shared by a plurality of processors or a plurality of elements included in one processor needs to share a memory at the same time, the portable terminal will be described hereinafter for the convenience of description and understanding. Moreover, it shall be easily understood through the below description that the present invention is not limited to a specific type of terminal but is applicable equivalently to any terminal having a memory shared by a plurality of processors or elements.

Figure 3:
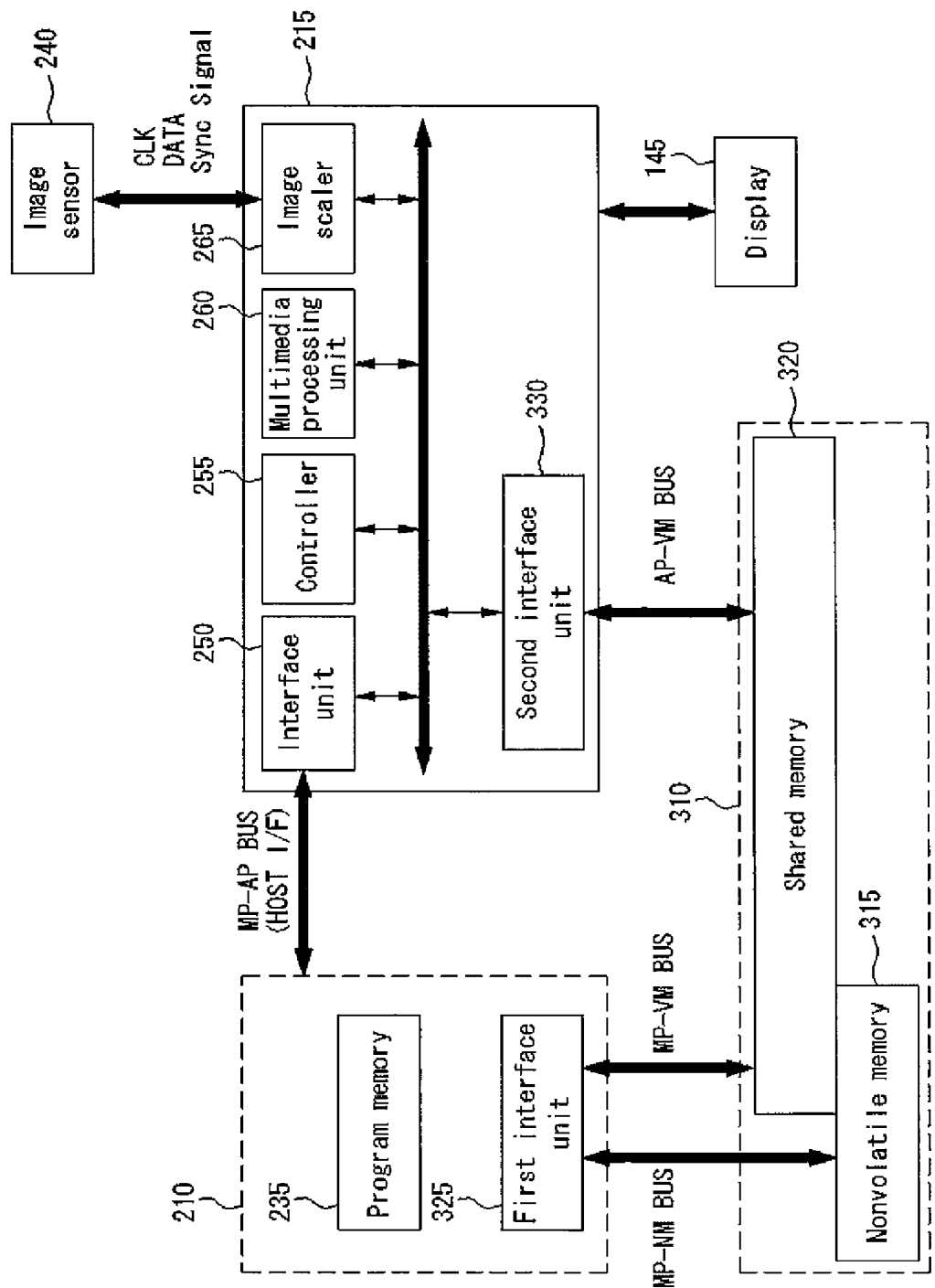
FIG. 3 illustrates a linking structure between processors in accordance with an embodiment of the present invention.
Figure 4:
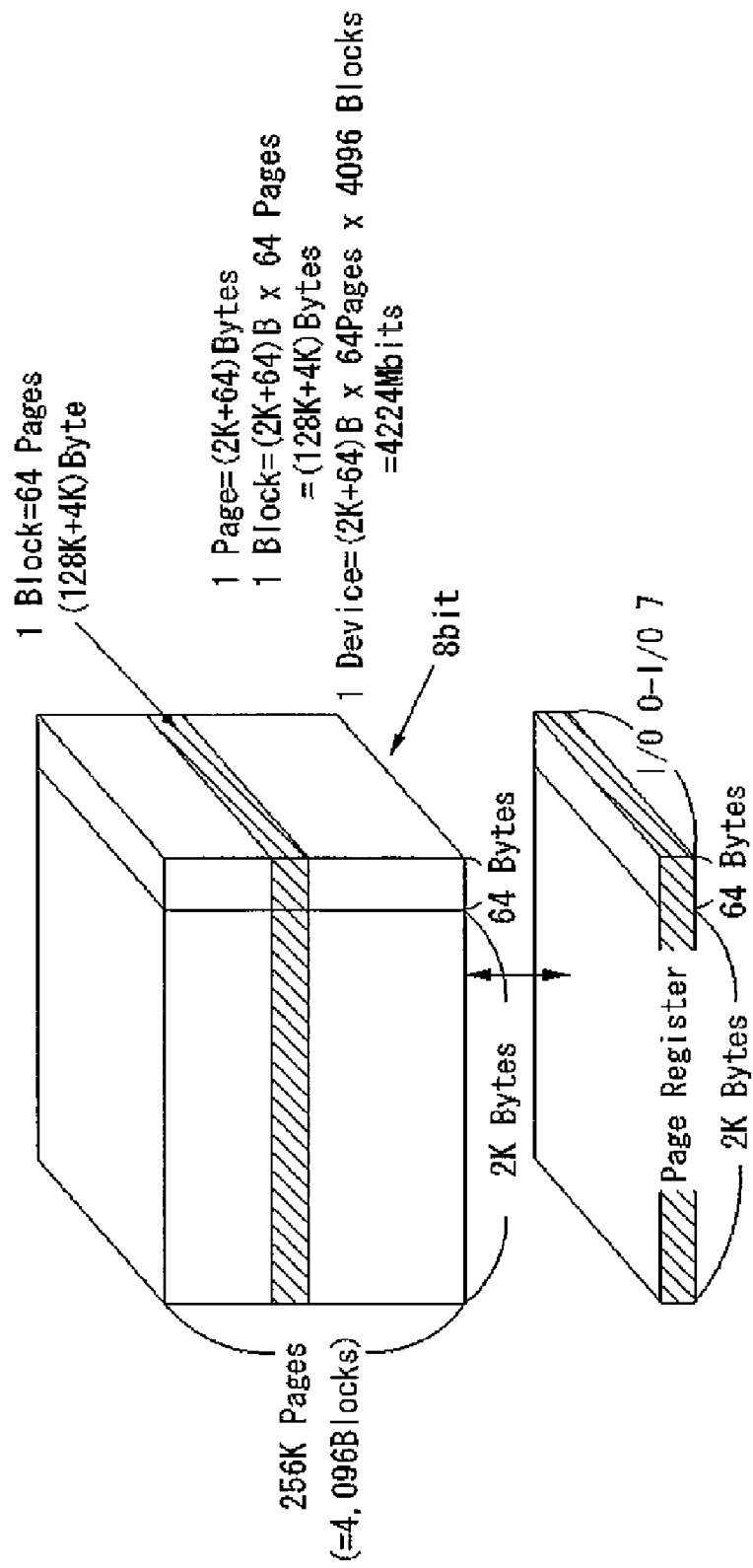
FIG. 4 illustrates a structure of a typical nonvolatile memory.
Figure 5:
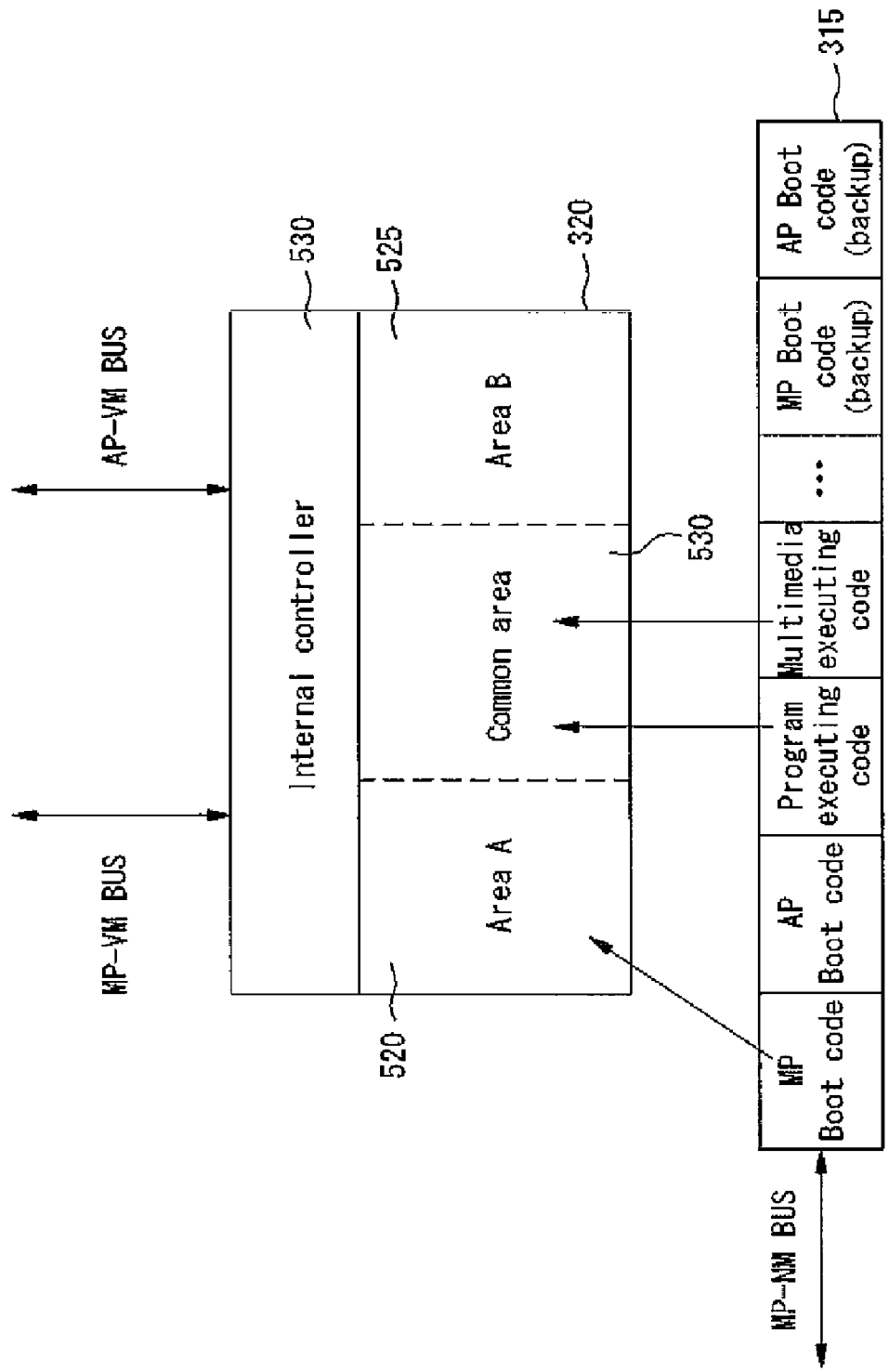
FIG. 5 is a conceptual diagram illustrating a method for linking a nonvolatile memory and a shared memory in accordance with an embodiment of the present invention.

FIG. 3 illustrates a linking structure between processors in accordance with an embodiment of the present invention, and FIG. 4 illustrates a structure of a typical nonvolatile memory. FIG. 5 is a conceptual diagram illustrating a method for linking a nonvolatile memory and a shared memory in accordance with an embodiment of the present invention.

In this description with reference to the related drawings, it is assumed that the application processor 215 is a multimedia processor for controlling the image sensor 240 and for processing a signal (e.g. a signal corresponding to image data and/or audio data) inputted from the image sensor 240. An image signal processor can be further provided between the application processor 215 and the image sensor 240. Moreover, the shared memory 320, which is coupled to the application processor 125, will be shared by each element included in the application processor 215 as well as the main processor 210.

As illustrated in FIG. 3, the main processor 210 is coupled to the application processor 215 through an MP-AP bus, which is a host interface, and the nonvolatile memory 315 through an MP-NM (nonvolatile memory) bus. Also, the main processor 210 is coupled to the shared memory 320 through an MP-VM bus. The nonvolatile memory 315, for example, can be a NAND flash memory or a NOR flash memory. The shared memory 320 can be a volatile memory, for example, an SDRAM. The nonvolatile memory 315 and the shared memory 320 can be realized in a single chip 310 by the multi-chip package technology. The main processor 210 can control a first interface to write data in the shared memory 320 and/or the nonvolatile memory 315 or read data from the respective memory (e.g. in the shared memory 320 or the nonvolatile memory 315).

The main processor 210 can control each element included in a portable terminal. For example, in the case of the portable terminal having a plurality of application processors, the main processor 210 can control the function of each application processor through a host interface. Also, main processor 210 reads and stores in the shared memory 320 AP boot codes (i.e. AP boot codes required for booting the application processor 215) such that the application processor 215 can be connected to the shared memory 320 and use corresponding AP boot codes.

The application processor 215 is coupled to the main processor 210 through the MP-AP bus, which is the host interface, and the shared memory 320 through the AP-VM bus. The application processor 215 is further coupled to the display 145 and the image sensor 240 through the MP-AP bus and the AP-VM bus, respectively.

The application processor 215 includes an interface unit 250, a controller 255, a multimedia processing unit 260, an image scaler 265 and a second interface unit 330. Besides, the application processor 215 can further have a codec unit for data encoding/decoding.

The interface unit 250 communicates information between the application processor 215 and the main processor 210, which are coupled through the MP-AP bus. The application processor 215 carries out an operation corresponding to a control signal (e.g. a booting command or a data processing command), received from the main processor 210 through the interface unit 250. The main processor 210 can transfer the control signal of predetermined format to the application processor 215. Alternatively, the main processor 210 can transfer the control signal to the application processor 215 by writing a value in a predetermined register of the application processor 215. For example, in case that the main processor 210 attempts to access the shared memory 320 (or a common area 530 in FIG. 5), the main processor 210 must inform the application processor 215 of being connected to the shared memory 320. In case that an access register is equipped in the application processor 215, the main processor 210 accesses the application processor 215 through the MP-AP bus and then renews the access register to a predetermined value. Through this, it can be informed that the main processor 210 is connected to the common area. For example, assuming that a state where the access register has a first value (e.g. 1) represents that the main processor 210 is connected to the common area, the main processor 210 is connected to the application processor 215 through the host interface and renews a second value (e.g. zero) to the first value.

The controller 225 performs booting the application processor 215 by using the AP boot coded written in the shared memory 320 in accordance with a boot command inputted from the main processor 210 and controls an operation of the application processor 215 by a program built-in or written in the shared memory 320. That is, the controller 255 displays through the display 145 and stores in the shared memory 320 the booting of the application processor 215, the operation controlling of the application processor 215, the reading of data required for program performing from the shared memory 320 or for operating of the application processor 215 and processed programming result. Also, the controller 255 can check whether there is an error in the AP boot code, which the main processor 210 writes in the shared memory 320.

The controller 255 can access a particular partitioned area (e.g. the common area 530 or a dedicated area 520 or 525, referring to FIG. 5) through the second interface unit 330 and the AP-VM bus. Typically, the controller 255 controls the operation of the application processor 215 in accordance with a control signal (e.g. a renewing state of a register value) received from the main processor 210. The controller 255 can manage the access register (i.e. a register for indicating whether the common area 530 of storage areas of the shared memory 320 is accessed) and a display register (i.e. a register for instructing to transfer the data stored in the common area 530 to the display 145). The controller 255 can be, for example, a microcontroller unit.

The multimedia processing unit 260 reads the data stored in the shared memory 320 (or a particular partitioned area) through the second interface unit 330, encodes the data read by the controller 255 to a predetermined format (e.g. JPEG or MPEG4), or adds necessary effects to the data. The multimedia processing unit 260 can store the processed data in the shared memory 320 (or a particular storage area (e.g. the common area 530 or the dedicated area 520 or 525)). Further, the multimedia processing unit 260 reads and decodes a compressed file, which the main processor 210 stores in the common area 530 of the storage areas of the shared memory 530, and display on the display 145.

The image scaler 265 processes data inputted from the image sensor 240 in accordance with the control of the controller 255 to convert it to a predetermined data. The image scaler 265 can, for example, generate a softened image through size adjustment, color change and filtering of the image. The data processed by the image scaler 265 can be stored in the shared memory 320 (or a particular partitioned area) through the AP-VM bus by the second interface unit 330.

The image scaler 265 of the present invention is merely one embodiment of an element processing and storing in the shared memory 320 the data inputted from the image sensor 240. Accordingly, it shall be evident that the present invention can be widely applied to any multimedia data input unit that needs to store multimedia data (e.g. image data and/or audio data) in real time in the shared memory 320.

Similarly, the multimedia processing unit 260, illustrated in FIG. 3, is merely one embodiment of an element processing multimedia data stored in the shared memory 320, and it shall be evident that the present invention can be widely applied to any multimedia data processing unit that processes multimedia data stored in the shared memory 320 and stores the processed data in the shared memory 325 again, displays the data through the display 145 or sends the data to the main processor 210.

The second interface unit 330 controls an element of the application processor 215 to access the shared memory 320 through the AP-VM bus. In case that a plurality of elements (e.g. the multimedia processing unit 260 and the image scaler 265) try to access the shared memory 320, the second interface unit 330 can control the elements to access the shared memory 320 in accordance with a predetermined priority. Also, the second interface unit 330 can control the data processed by an element to be stored in a particular partitioned area of the shared memory 320.

As illustrated above, in the case that the application processor 215 is a multimedia processor, the application processor 215 processes the multimedia data, inputted and processed from the image sensor 240, and stores (i.e. writes) the processed data in the shared memory 320, processes and displays through the display 145 the data stored in the shared memory 320.

The shared memory 320 is equipped with two access ports, through each of which the shared memory 320 is coupled to the main processor 210 and the application processor 215. The number of ports that the shared memory 320 has can increase or decrease in accordance with the number of processors that are connected thereto. That is, the shared memory 320 can be equipped with a plurality of access ports and be coupled to each processor at a different time to write and/or read data. Whether a processor is presently accessed to the shared memory 320 must be notified to the other processor. This can be done through communicating status information or renewing register values.

However, if the application processor 215 is accessed to the shared memory 320 through the AP-VM bus to store in real time the multimedia data inputted and processed from the image sensor 240, it may be impossible for the main processor 210 to access the shared memory 320 to write and/or read data. To prevent this, the shared memory 320 can be partitioned to a plurality of storage areas, as illustrated in FIG. 5. The method of partitioning the shared memory 320 to a plurality of storage areas and running the shared memory 320 in a plurality of storage areas will be described in detail later.

The shared memory 320 and the nonvolatile memory 315 can be embodied as one chip 310 through the MCP technology.

The nonvolatile memory 315, which is coupled to the main processor 210 through the MP-NM bus, can be a NAND flash memory or a NOR flash memory. The nonvolatile memory 315 can store boot codes and fonts for booting the main processor 210 and the application processor 215.

As illustrated in FIG. 3, in case that the nonvolatile memory is a NAND flash memory, the data is written in units of page, which consists of 2048 bytes of main area and 64 bytes of spare area.

Typically, in the NAND flash memory, it is likely that an error occurs in the main area (2048 bytes) while being used, due to the memory properties.

If a 1-bit error occurred, the respective data can be used by correcting the 1-bit error in accordance with the generation of an error correcting code, which is error correcting information, and a correcting method. Since the generation of the error correcting code and the correcting method are well-known to any person of ordinary skill in the art, the pertinent description thereof will be omitted. When data is stored in the NAND flash memory, a circuit applied with an error correcting algorithm is provided and thus, an error code is stored in the spare area in order to correct the 1-bit error.

On the other hand, in case that an error of 2 or more bits occurred, the block in which the error occurred is defined as an uncorrectable block (i.e. an unusable block). Then, this block is stored in the spare area to stop using the block from the next time. That is, if the error of 2 or more bits occurred, the block of the error is stored as the unusable block in the spare area to stop using this block from the next time. Accordingly, the main processor 210, when using the NAND flash memory, controls the NAND flash memory to exclude the block of the error by reading the block of the error.

FIG. 5 is a conceptual diagram illustrating a method for linking the nonvolatile memory and the shared memory, which can be realized in one chip in accordance with the multi-chip package technology.

As illustrated in FIG. 5, stored in the nonvolatile memory 315 are an MP boot code for booting the main processor 210, an AP boot code for booting the application processor 215, a program executing code needed for operating the main processor 210 or the application processor 215, a code needed for processing multimedia data (e.g. image data and audio data) of the application processor 215 and backup data for recovering an error occurred in the MP boot code or AP boot code. An area can be pre-assigned to store each of these data.

The shared memory 320 is equipped with one internal controller 410 and is structured to allow each of the processors 210 and 215 to access the storage areas through two access ports.

As described above, the storage area can be sectioned into a plurality of partitioned areas. For example, the storage area can have an area A 520, which the main processor 210 can exclusively access to write and read data, an area B 525, which the application processor 215 can exclusively access to write and read data, and a common area 530, which both the main processor 210 and the application 215 can access to write and read data. The common area 530 can be accessed by the main processor 210 and the application 215. However, the main processor 210 and the application 215 cannot access the common area 530 at the same time. In case that any one of the main processor 210 and the application processor 215 is accessing the common area 530, the other processor must be able to be notified of the access.

The storage area of the shared memory 320 can further include a variable area (not shown) for the expansion of another area. The variable area can be entirely included in another area (e.g. the common area) to increase the size of the respective area. Alternatively, the variable area can be partially included in a plurality of areas (e.g. the area A and the area B) to increase the size of the respective areas. The variable area is not restricted to be fixedly included in each area, and as necessary, can be set to be variably included in a particular area. For example, in case that the main processor 210 controls whether the variable area is to be included in a particular area, the main processor 210 sets the variable area to be included in the particular area during the booting process. Then, if the particular area (e.g. the area A or the common area) of the shared memory runs out of storage space while writing data, the main processor 210 can control the variable area of another other area to be transferred to the particular area. It can be preferable that reset information of the variable area is transferred to and recognized by the other processor through the host interface. Similarly, the resetting of the variable area can be carried out by the application processor 215, and the corresponding information can be transmitted to the main processor 210. Alternatively, the main processor 210 can be requested to have the variable area reset.

As describe above, once the storage area of the common memory 320 is partitioned into a plurality of partitioned areas in accordance with their respective use, the main processor 210 can have the data written in the nonvolatile memory 315 used by being copied to the corresponding partitioned area.

For example, in case that the main processor 210 performs the booting, a controller (not shown) of the main processor 210 accesses the nonvolatile memory 315 through the MP-NM bus and reads the MP boot code. Then, the controller of the main processor 210 writes the read MP boot code in the area A 520 or the common area 530 of the common memory 320. This is because the main processor 210 can access the corresponding areas. The controller of the main processor 210 can carry out the booting by using the MP boot code written in the common memory 320. A boot loader for reading the MP boot code from the nonvolatile memory 315 or the common memory 320 can be included, as a hardware structure, in the controller.

Similarly, in order for the main processor 210 to instruct the application processor 215 to perform booting, the controller of the main processor 210 accesses the nonvolatile memory 315 through the MP-NM bus and reads the AP boot code. Then, the controller of the main processor 210 writes the read AP boot code in the common area 530. The application processor 215 carries out the booting by accessing the shared memory 320 through the AP-VM bus and reading the AP boot code. The main processor 210 can send a booting command to the application processor 215 before or after writing the AP boot code in the common area 530. If the booting command is received before the writing of the AP boot code in the common area 530, the application processor 215 shall attempt to access the common area 530 after the main processor 210 finishes accessing the common area 530. The controller can have a boot loader, for reading the AP boot code from the shared memory 320, as a hardware structure.

Also, the main processor 210 can transfer data (e.g. a multimedia executing code), required for the operation of the application processor 215, of the data written in the nonvolatile memory 315 to the application processor 215 by writing the data in the common area 530. The application processor 215 can use the data as it is written in the common area 530 or by transferring the data to the area B 525.

Figure 6:
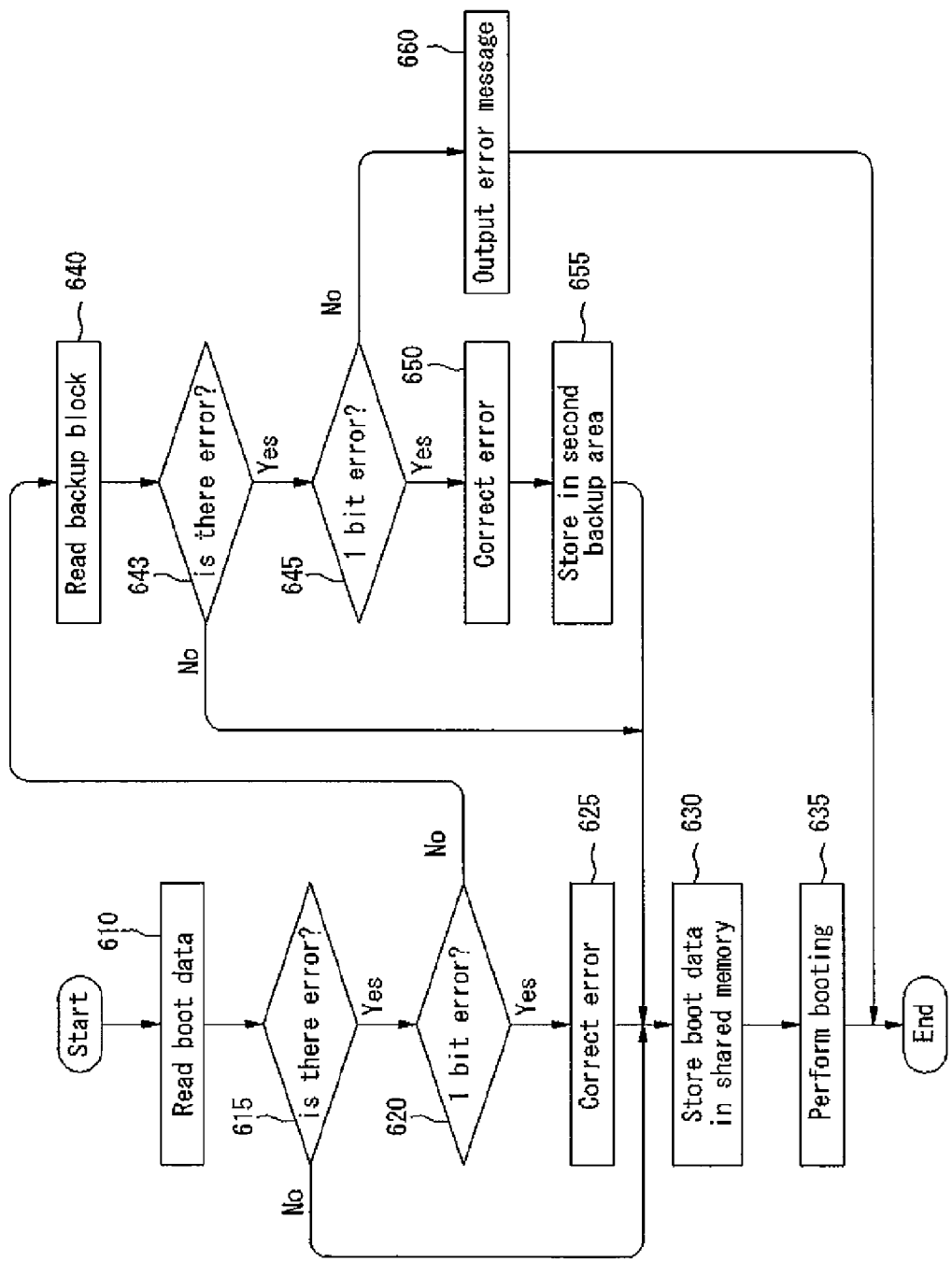
FIG. 6 is a flowchart illustrating a boot error detecting method in accordance with an embodiment of the present invention.

FIG. 6 is a flowchart illustrating a boot error detecting method in accordance with an embodiment of the present invention.

The boot error detection in accordance with the present invention can be performed in the main processor 210 and/or the controller 255 of the application processor 215. The process in which the controller of the main processor 210 carries out the boot error detecting operation will be described below. For the convenience of description and understanding, it will be assumed that both the boot data reading and the boot error detecting are performed by the main processor 210.

Referring to FIG. 6, the main processor 210 reads a boot code written in a particular area of the nonvolatile memory 315 in a step represented by 610 and determines whether there is an error in the read boot code in a step represented by 615.

If the read boot code has no error, the main processor 210 writes the read boot code in the shared memory 320 in a step represented by 630 and carries out the booting with the boot code written in the shared memory 320. If the read boot code is the AP boot code, the application processor 215 shall perform the booting by using the AP boot code in accordance with a booting command provided from the main processor 210.

If there is an error in the read boot code, the main processor 210 determines whether the error is a 1-bit error in a step represented by 620. In the case of the 1-bit error, the main processor 210 corrects the 1-bit error in a step represented by 625. Then, the step represented by 630 is performed. The boot code corrected in the step represented by 625 can be stored in a new backup area.

If it is determined in the step represented by 620 that there is an error of 2 or more bits, the main processor 210 reads again the boot code in the backup area of the nonvolatile memory 315 in a step represented by 640 and determines whether the read boot code has an error in a step represented by 643.

In case that there is no error in the read boot code, the operation returns to the step represented by 630.

In the case of including an error, the main processor 210 determines whether the read boot error has a 1-bit error in a step represented by 645. If the error is a 1-bit error, the 1-bit error correction is performed, and the corrected boot code is stored in a new backup area in a step represented by 655. In the booting steps that follow, more stable booting can be performed by using the corrected boot code stored in the new backup area. Of course, the corrected boot code may not be stored in the new backup area, and instead, the area where the boot code has been stored (i.e. the MP boot code storage area or the AP boot code storage area) can be renewed.

If it is determined in the step represented by 645 that the error is a 2-bit error, the main processor 210 outputs an error message through the display 145 or a speaker.

As described above, the boot error detecting method, executed by further equipping the boot code backup storage area as well as the boot code storage area in the nonvolatile memory 315, in accordance with the present invention, performs the 1-bit error correction or the booting by using the boot codes (backup) written in the boot code backup storage area if there is an error in the boot codes stored in the boot code storage area. The 1-bit error correction can be performed for the boot codes (backup) stored in the boot code backup storage area. Also, the future booting can be guaranteed to be stable by storing in a new backup storage area the error-free boot code (backup) that is 1-bit error corrected or read from the boot code backup storage area or by renewing the boot code storage area.

So far, the method of detecting the boot error, carried out by the main processor 210, has been described. The main processor 210 can detect the boot error not only for the MP boot code but also for the AP boot code. Of course, the boot error detection for the AP boot code can be performed by the application processor 215. For this, it will be necessary that the main processor 210 store in the shared memory 320 the AP boot code written in the AP boot code storage area and the AP boot code (backup) written in the AP boot code backup storage area.

So far, the error detecting and correcting method for the boot code has been described. It shall be evident, however, without any additional description that the same technical idea can be applied to data required for driving each processor (e.g. a program executing code).

As described above, the method and device for correcting a code data error in accordance with the present invention can allow a system to be correctly operated due to promptly dealing with an error when the error in boot codes is detected or generated The present invention can also quickly transfer boot codes and processed data to an application processor.

The present invention can also acquire the reliability of boot codes by managing backup data for the boot codes.

Moreover, the present invention can recover and use a bit error of 2 or more bits occurred or a boot code deleted in a storage area written with boot codes.

Moreover, the present invention can promptly transfer and use data by partitioning a storage area.

Furthermore, the present invention can be commonly applied to data required for the operation of each processor to stably operate the processor.

The drawings and detailed description are only examples of the present invention, serve only for describing the present invention and by no means limit or restrict the spirit and scope of the present invention. Thus, any person of ordinary skill in the art shall understand that a large number of permutations and other equivalent embodiments are possible. The true scope of the present invention must be defined only by the spirit of the appended claims.

What is claimed is:

1. A digital processing device comprising a main processor and one or more application processors, the digital processing device comprising:
    a nonvolatile memory, the nonvolatile memory being coupled to the main processor through an MP-NM bus, the nonvolatile memory comprising a code data area and a backup area, first code data being written in the code data area, second code data being backed up in the backup area, the second code data being identical to the first code data; and
    a shared memory, the shared memory being shared by the main processor and the application processor, the first code data or a third code data being written in the shared memory,
    wherein if the first code data has an error, the main processor writes in the shared memory the second code data or the third code data that is error-corrected by a predetermined error correcting method, and the main processor or the application processor performs an operation corresponding to the third code data, and
    wherein the shared memory has two or more ports, and one of the ports is assigned to the main processor and another one of the ports is assigned to the application processor.

2. The device of claim 1, wherein the main processor generates the third code data by using the error correcting method if the first code data has a 1-bit error, and the main processor generates the third code data by using the second code data if the first code data has an error of 2 or more bits.

3. The device of claim 2, wherein the main processor generates the third code data by using the error correcting method if the second code data includes a 1-bit error, and the main processor controls to output an error message if the second code data has an error of 2 or more bits.

4. The device of claim 1, wherein the main processor writes the third code data in the nonvolatile memory.

5. The device of claim 1, wherein a storage area of the shared memory is partitioned to comprise an area accessible by the main processor only, an area accessible by the application processor only, and a common area accessible by both the main processor and the application processor.

6. The device of claim 1, wherein the nonvolatile memory and the shared memory are realized in one chip by a multi-chip package technology.

7. The device of claim 1, wherein the first, second, and third code data are at least one of boot code data, program executing data and code data for performing a multimedia function.

8. The device of claim 7, wherein the application processor is booted by using the boot code data written in the shared memory.

9. A main processor, being coupled to at least one application processor and controlling an operation of the application processor, the main processor comprising:
    an interface unit, accessing a nonvolatile memory through an MP-NM bus and accessing a shared memory through an MP-VM bus; and
    a controller, writing in the shared memory through the interface unit third code data generated by using a predetermined error correcting method or a second code data written in a backup area of the nonvolatile memory if there is an error in first code data written in a code data area of the nonvolatile memory,
    wherein the shared memory has two or more ports, and one of the ports is assigned to the main processor and another one of the ports is assigned to the application processor.

10. The main processor of claim 9, wherein the controller generates the third code data by using the error correcting method if the first code data has a 1-bit error, and the controller generates the third code data by using the second code data if the first code data has an error of 2 or more bits.

11. The main processor of claim 10, wherein the controller generates the third code data by using the error correcting method if the second code data includes a 1-bit error, and the controller controls to output an error message if the second code data has an error of 2 or more bits.

12. The main processor of claim 9, wherein a storage area of the shared memory is partitioned to comprise an area accessible by the main processor only, an area accessible by the application processor only, and a common area accessible by both the main processor and the application processor.

13. The main processor of claim 9, wherein the nonvolatile memory and the shared memory are realized in one chip by a multi-chip package technology.

14. The main processor of claim 9, wherein the first, second, and third code data are at least one of boot code data, program executing data and code data for performing a multimedia function.

15. The main processor of claim 14, wherein the controller generates and writes in the shared memory boot code data for booting the application processor, and the application processor is booted by using the boot code data written in the shared memory.

16. An application processor, being coupled to a main processor and being controlled by the main processor having accessed the nonvolatile memory through an MP-NM bus and having accessed a shared memory through an MP-VM bus, has written in a first area of the shared memory first code data written in a code data area of a nonvolatile memory and written in a second area of the shared memory second code data written in a backup area of the nonvolatile memory, the application processor comprising:

an interface unit, accessing a shared memory through an AP-VM bus; and a controller, writing in the shared memory third code data generated by using a predetermined error correcting method or the second code data written in the second area of the shared memory if there is an error in the first code data written in the first area of the shared memory, and performing an operation in accordance with the third code data, wherein a storage area of the shared memory comprises an area accessible by the main processor only, an area accessible by the application processor only and a common area accessible by both the main processor and the application processor, and the first area and the second area are included in the common area.

17. The application processor of claim 16, wherein the controller generates the third code data by using the error correcting method if the first code data has a 1-bit error, and the controller generates the third code data by using the second code data if the first code data has an error of 2 or more bits.

18. The application processor of claim 16, wherein the controller generates the third code data by using the error correcting method if the second code data includes a 1-bit error, and the controller controls to output an error message if the second code data has an error of 2 or more bits.

19. The application processor of claim 16, wherein the first, second, and third code data are at least one of boot code data, program executing data and code data for performing a multimedia function.

20. A code data error correcting method by a main processor included in a digital processing device, the device comprising a main processor and at least one application processor, the method comprising:

reading first code data written in a code data area of a nonvolatile memory and determining whether there is an error in the first code data;

generating and storing in a shared memory code data error-corrected by a predetermined error correcting method if there is a 1-bit error in the read first code data; and reading second code data written in a backup area of the nonvolatile memory if there is an error of two or more bits in the read first code data, wherein the nonvolatile memory is coupled to the main processor through an MP-NM bus, and the shared memory is shared by the main processor and the application processor, and wherein the shared memory has two or more ports, and one of the ports is assigned to the main processor and another one of the ports is assigned to the application processor.

21. The method of claim 20, further comprising:

generating and storing in the shared memory code data error-corrected by the error correcting method if there is a 1-bit error in the second code data; and outputting an error message if there is an error of two or more bits in the second code data.

* * * * *